US009076062B2

(12) United States Patent
Hamming et al.

(10) Patent No.: US 9,076,062 B2
(45) Date of Patent: Jul. 7, 2015

(54) FEATURE SEARCHING ALONG A PATH OF INCREASING SIMILARITY

(71) Applicant: Gravity Jack, Inc., Liberty Lake, WA (US)

(72) Inventors: Benjamin William Hamming, Spokane, WA (US); Shawn David Poindexter, Coeur d'Alene, ID (US)

(73) Assignee: Gravity Jack, Inc., Liberty Lake, WA (US)

( * ) Notice: Subject to any disclaimer, the term of this patent is extended or adjusted under 35 U.S.C. 154(b) by 252 days.

(21) Appl. No.: 13/683,923

(22) Filed: Nov. 21, 2012

(65) Prior Publication Data
US 2014/0079320 A1    Mar. 20, 2014

Related U.S. Application Data

(60) Provisional application No. 61/702,181, filed on Sep. 17, 2012.

(51) Int. Cl.
G06K 9/00    (2006.01)
G06K 9/62    (2006.01)
G06K 9/46    (2006.01)
G06K 9/32    (2006.01)

(52) U.S. Cl.
CPC .............. *G06K 9/46* (2013.01); *G06K 9/00671* (2013.01); *G06K 9/3233* (2013.01)

(58) Field of Classification Search
None
See application file for complete search history.

(56) References Cited

U.S. PATENT DOCUMENTS

| 5,093,869 | A * | 3/1992 | Alves et al. ..................... 382/199 |
| 2003/0219146 | A1* | 11/2003 | Jepson et al. .................. 382/103 |
| 2007/0030896 | A1* | 2/2007 | Comaniciu et al. ....... 375/240.08 |
| 2007/0217665 | A1* | 9/2007 | Kiraly et al. .................. 382/128 |
| 2008/0273752 | A1* | 11/2008 | Zhu et al. ..................... 382/103 |
| 2009/0129675 | A1* | 5/2009 | Eggert et al. .................. 382/173 |
| 2011/0242133 | A1 | 10/2011 | Greaves et al. |
| 2012/0025974 | A1 | 2/2012 | Richey et al. |
| 2012/0025975 | A1 | 2/2012 | Richey et al. |
| 2012/0025976 | A1 | 2/2012 | Richey et al. |
| 2012/0114252 | A1* | 5/2012 | Yamada et al. ............... 382/201 |
| 2012/0224032 | A1* | 9/2012 | Takiguchi ....................... 348/47 |
| 2012/0294538 | A1* | 11/2012 | Yamada et al. ............... 382/218 |
| 2012/0326841 | A1* | 12/2012 | Aoki ............................ 340/5.82 |
| 2013/0002866 | A1* | 1/2013 | Hampapur et al. ........... 348/143 |
| 2013/0129229 | A1* | 5/2013 | Ernst et al. .................... 382/217 |
| 2014/0078174 | A1 | 3/2014 | Williams et al. |
| 2014/0079281 | A1 | 3/2014 | Williams et al. |

OTHER PUBLICATIONS

U.S. Appl. No. 13/473,466.
U.S. Appl. No. 13/683,872, filed Nov. 21, 2012, Hamming, et al., "Feature Searching Based on Feature Quality Information" 38 pages.
U.S. Appl. No. 13/683,902, filed Nov. 21, 2012, Hamming, et al., "Pose Tracking through Analysis of an Image Pyramid" 40 pages.

* cited by examiner

*Primary Examiner* — Randolph I Chu
(74) *Attorney, Agent, or Firm* — Wells St. John P.S.

(57) ABSTRACT

Techniques for searching in an image for a particular block of pixels that represents a feature are described herein. The techniques may include searching within an expanding search area to find a block of pixels that has a threshold amount of similarity to a block of pixels of a preceding image. Upon finding a block of pixels that satisfies the threshold, the techniques may search in the image along a path of increasing similarity to the block of pixels of the preceding image.

22 Claims, 9 Drawing Sheets

FEATURE SEARCHING ALONG A PATH OF INCREASING SIMILARITY

CROSS-REFERENCES TO RELATED APPLICATIONS

This application claims priority to U.S. Patent Application No. 61/702,181, filed Sep. 17, 2012, the entire contents of which is incorporated herein by reference.

BACKGROUND

A growing number of people are using electronic devices, such as smart phones, tablets computers, laptop computers, portable media players, and so on. These individuals often use the electronic devices to consume content, purchase items, and interact with other individuals. In some instances, an electronic device is portable, allowing an individual to use the electronic device in different environments, such as a room, outdoors, a concert, etc. As more individuals use electronic devices, there is an increasing need to enable these individuals to interact with their electronic devices in relation to their environment.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
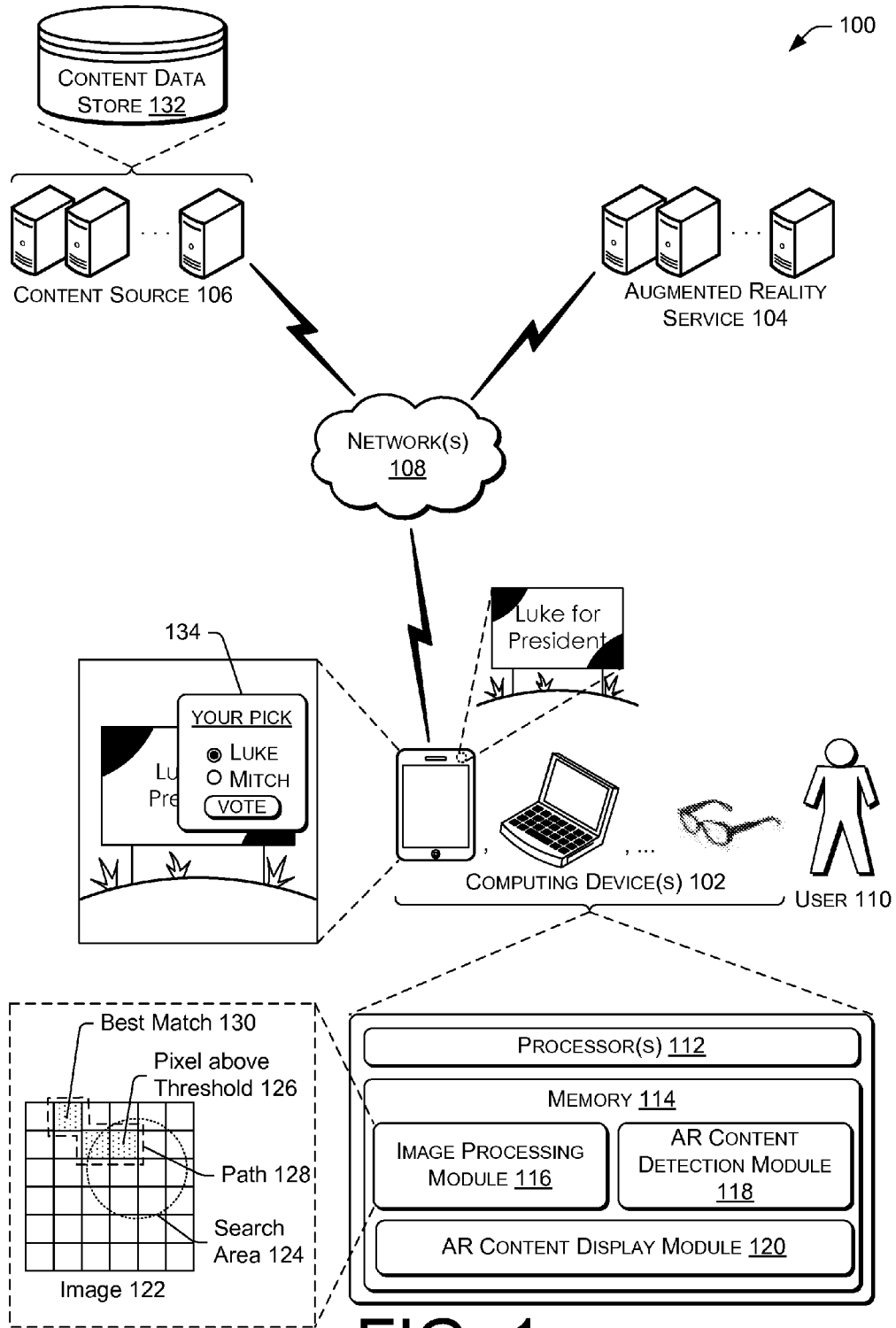
FIG. 1 illustrates an example architecture to search for a particular block of pixels in an image.

This application is related to "Pose Tracking through Analysis of an Image Pyramid" and "Feature Searching Based on Feature Quality Information", filed concurrently herewith. The entire contents of both are incorporated herein by reference.

This disclosure describes architectures and techniques directed to, in part, searching for a particular block of pixels in an image. In particular implementations, a user may use a portable device (e.g., a smart phone, tablet computer, etc.) to capture images of an environment, such as a room, outdoors, and so on. The images may be processed to identify a textured target in the environment (e.g., surface or portion of a surface) that is associated with augmented reality content. When such a textured target is identified, the augmented reality content may be displayed on the device in an overlaid manner on real-time images of the environment. The augmented reality content may be maintained on a display of the device in relation to the textured target as the device moves throughout the environment. To display the augmented reality content in relation to the textured target, the textured target may be tracked in the images by locating the same features of the textured target throughout the images.

To locate a feature of a textured target, a device may capture an initial image of an environment with a camera of the device. The initial image may represent a textured target of the environment, such as a surface or portion of a surface in the environment. The initial image may be processed to detect features in the image and extract a block of pixels for each of the features (e.g., feature descriptors). A feature may generally comprise a point of interest in the image, such as a corner, edge, blob, or ridge.

Thereafter, the device may capture a subsequent image and search the subsequent image to locate a block of pixels that corresponds to a feature of the initial image. The device may estimate a location in the subsequent image where the feature of the initial image may be found and search in a particular area centered on the estimated location. The search may include comparing a block of pixels representing a feature in the initial image to blocks of pixels in the particular area of the subsequent image to locate a block of pixels that has a threshold amount of similarity to the block of pixels of the initial image (referred to as "threshold block of pixels" for this example). If the device does not locate a threshold block of pixels in the particular area of the subsequent image, the particular area may be expanded to encompass a larger area in the subsequent image. This expanded area may be searched in a similar manner.

Upon locating a threshold block of pixels in the subsequent image, the device may search in the subsequent image from the threshold block of pixels along a path of increasing similarity to the block of pixels of the initial image. The search may locate a block of pixels in the subsequent image that corresponds to the block of pixels of the initial image (e.g., a "best match"). To search along the path of increasing similarity, the device may search an area centered on the threshold block of pixels to locate a block of pixels that has a larger amount of similarity to the block of pixels of the initial image than the threshold block of pixels. When such a block of pixels is located, the device may search in an area centered on the block of pixels of larger similarity to locate a block of pixels that has yet a larger amount of similarity to the block of pixels of the initial image. This process may continue until the device finds a block of pixels in the subsequent image that corresponds to the block of pixels of the initial image (e.g., a block of pixels that has the largest amount of similarity). By doing so, the search may continue along a path of increasing similarity to the block of pixels of the initial image. That is, the search may ascend along a steepest gradient of similarity in the subsequent image to find a block of pixels in the subsequent image that corresponds to the block of pixels of the initial image.

In some instances, the device may utilize a found block of pixels in the subsequent image to process an associated textured target represented in the subsequent image. For example, the device may utilize the block of pixels to track a location of the textured target, identify a pose of the textured target, and/or determine a velocity of the textured target relative to the device.

By utilizing the techniques described herein, a textured target may be intelligently located throughout multiple images. For example, by searching in an image along a path of increasing similarity after a threshold block of pixels is located in the image, a particular block of pixels that is associated with the textured target may be intelligently found. That is, a same feature of a textured target may be tracked through multiple images. This may allow augmented reality content to be displayed in relation to the textured target and create a perception that the content is part of an environment.

This brief introduction is provided for the reader's convenience and is not intended to limit the scope of the claims, nor the proceeding sections. Furthermore, the techniques described in detail below may be implemented in a number of ways and in a number of contexts. One example implementation and context is provided with reference to the following figures, as described below in more detail. It is to be appreciated, however, that the following implementation and context is but one of many.

Example Architecture

FIG. 1 illustrates an example architecture 100 in which techniques described herein may be implemented. In particular, the architecture 100 includes one or more computing devices 102 (hereinafter the device 102) configured to communicate with an Augmented Reality (AR) service 104 and a content source 106 over a network(s) 108. The device 102 may augment a reality of a user 110 associated with the device 102 by modifying the environment that is perceived by the user 110. In many examples described herein, the device 102 augments the reality of the user 110 by modifying a visual perception of the environment, such as by adding visual content. However, the device 102 may additionally, or alternatively, modify other sense perceptions of the environment, such as a taste, sound, touch, and/or smell.

The device 102 may be implemented as, for example, a laptop computer, a desktop computer, a smart phone, an electronic reader device, a mobile handset, a personal digital assistant (PDA), a portable navigation device, a portable gaming device, a tablet computer, a watch, a portable media player, a hearing aid, a pair of glasses or contacts having computing capabilities, a transparent or semi-transparent glass having computing capabilities (e.g., heads-up display system), another client device, and the like. In some instances, when the device 102 is at least partly implemented by glass, such as a pair of glasses, contacts, or a heads-up display, computing resources (e.g., processor, memory, etc.) may be located in close proximity to the glass, such as within a frame of the glasses. Further, in some instance when the device 102 is at least partly implemented by glass, images (e.g., video or still images) may be projected or otherwise provided on the glass for perception by the user 110.

The device 102 may be equipped with one or more processors 112 and memory 114. The memory 114 may include software functionality configured as one or more "modules." The term "module" is intended to represent example divisions of the software for purposes of discussion, and is not intended to represent any type of requirement or required method, manner or necessary organization. Accordingly, while various "modules" are discussed, their functionality and/or similar functionality could be arranged differently (e.g., combined into a fewer number of modules, broken into a larger number of modules, etc.). As illustrated, the memory 114 may include an image processing module 116, an Augmented Reality (AR) content detection module 118, and an AR content display module 120.

The image processing module 116 may be configured to process one or more images of an environment in which the device 102 is located. The image processing module 116 may generally locate a same feature of a textured target throughout multiple images. For example, as illustrated in FIG. 1, the module 116 may search an image 122 within an expandable search area 124 to locate a block of pixels that has a threshold amount of similarity to a block of pixels representing a feature of another image (e.g., an initially captured image). Such block of pixels may be centered on the pixel above the threshold 126. Upon identifying the block of pixels that satisfies the threshold, the module 116 may search along a path 128 of increasing similarity to the block of pixels of the other image to locate a block of pixels in the image that corresponds to the block of pixels of the other image (e.g., a "best match" or feature having a largest amount of similarity). The block of pixels that corresponds to the block of pixels of the other image may be centered on the pixel that is the best match 130. Further details of the image processing module 116 will be discussed below in reference to FIG. 2.

The memory 114 may additionally include the AR content detection module 118 configured to detect AR content that is associated with an environment of the device 102. The module 118 may generally trigger the creation of an AR experience when one or more criteria are satisfied, such as detecting that the device 102 is located within a predetermined proximity to a geographical location that is associated with AR content and/or detecting that the device 102 is imaging a textured target that is associated with AR content. Further details of the AR content detection module 118 will be discussed below in reference to FIG. 2.

Further, the memory 114 may include the AR content display module 120 configured to control display of AR content on the device 102. The module 120 may generally cause AR content to be displayed in relation to a real-time image of a textured target in the environment. For example, the module 120 may cause the AR content to be displayed in an overlaid manner on the textured target. By displaying AR content in relation to a textured target, the module 126 may create a perception that the content is part of an environment in which the textured target is located. Further details of the AR content display module 120 will be discussed below in reference to FIG. 2.

Although the modules 116-120 are illustrated in the example architecture 100 as being included in the device 102, in some instances one or more of these modules may be included in the AR service 104. In these instances, the device 102 may communicate with the AR service 104 (e.g., send captured images, etc.) so that the AR service 104 may execute the operations of the modules 116-120. In one example, the AR service 104 is implemented as a remote processing resource in a cloud computing environment with the device 102 merely capturing and displaying images.

The memory 114 (and all other memory described herein) may include one or a combination of computer readable storage media. Computer storage media includes volatile and non-volatile, removable and non-removable media implemented in any method or technology for storage of information such as computer readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. As defined herein, computer storage media does not include communication media, such as modulated data signals and carrier waves. As such, computer storage media includes non-transitory media.

The AR service 104 may generally assist in creating an AR experience through the device 102. For example, the AR service 104 may receive feature descriptors obtained through image processing at the device 102. A feature descriptor may generally describe a detected feature of an image, such as a block of pixels centered on the feature. The AR service 104 may compare a received feature descriptor with a library of feature descriptors for different textured targets to identify a textured target that is represented by the feature descriptor. Upon identifying a textured target, the AR service 104 may determine whether or not the textured target is associated with AR content. When AR content is identified, the service 104 may inform the device 102 that AR content is available and/or send the AR content to the device 102. Although the AR service 104 is illustrated in the example architecture 100, in some instances the AR service 104 may be eliminated entirely, such as when all processing is performed locally at the device 102.

Meanwhile, the content source 106 may generally manage content stored in a content data store 132. The content may include any type of content, such as images, videos, interface elements (e.g., menus, buttons, etc.), and so on, that may be used to create an AR experience. As such, the content may be referred to herein as AR content. In some instances, the content is provided to the AR service 104 to be stored at the AR service 104 and/or sent to the device 102. Alternatively, or additionally, the content source 106 may provide content directly to the device 102. In one example, the AR service 104 sends a request to the content source 106 to send the content to the device 102. Although the content data store 132 is illustrated in the architecture 100 as included in the content source 106, in some instances the content data store 132 is included in the AR service 104 and/or the device 102 and the content source 106 is eliminated entirely.

In some examples, the content source 106 comprises a third party source associated with electronic commerce, such as an online retailer offering items for acquisition (e.g., purchase). As used herein, an item may comprise a tangible item, intangible item, product, good, service, bundle of items, digital good, digital item, digital service, coupon, and the like. In one instance, the content source 106 offers digital items for acquisitions, including digital audio and video. Further, in some examples the content source 106 may be more directly associated with the AR service 104, such as a computing device acquired specifically for AR content and that is located proximately or remotely to the AR service 104. In yet further examples, the content source 106 may comprise a social networking service, such as an online service facilitating social relationships.

The AR service 104 and/or content source 106 may be implemented as one or more computing devices, such as one or more servers, laptop computers, desktop computers, and the like. In one example, the AR service 104 and/or content source 106 includes computing devices configured in a cluster, data center, cloud computing environment, or a combination thereof.

As noted above, the device 102, AR service 104, and/or content source 106 may communicate via the network(s) 108. The network(s) 108 may include any one or combination of multiple different types of networks, such as cellular networks, wireless networks, Local Area Networks (LANs), Wide Area Networks (WANs), and the Internet.

In one non-limiting example of the architecture 100, the user 110 may operate the device 102 to capture an initial image of a "Luke for President" poster (e.g., textured target). The device may then process the initial image to detect a feature that will be used for tracking the textured target throughout other images. The device may use a feature descriptor describing the feature to recognize the poster and find AR content. In this example, an interface element 134 (e.g., a menu) is identified as being associated with the poster.

The device 102 then captures a subsequent image of the "Luke for President" poster and analyzes the subsequent image to locate the feature of the initial image. The device 102 begins by searching within an initial search area to locate a block of pixels that has a threshold amount of similarity to a block of pixels that represents the feature of the initial image. If such a block of pixels is not found, then the device 102 may search within an expanded (e.g., larger) search area. Upon identifying a block of pixels that has a threshold amount of similarity, the device 102 may search along a path of increasing similarity to the block of pixels of the initial image to locate a block of pixels in the subsequent image that corresponds to the block of pixels of the initial image (e.g., a "best match").

The device 102 may then utilize one or more blocks of pixels of the poster in the subsequent image to determine a location of the poster. With the location, the device 102 may display the interface element 134 in relation to the poster, such as in an overlaid manner on the poster. Through the interface element 134 the user 110 may indicate who he will vote for as president. By displaying the interface element 134 in relation to the poster, the interface element 134 may appear as if it is located within the environment of the user 110.

Example Computing Device

Figure 2:
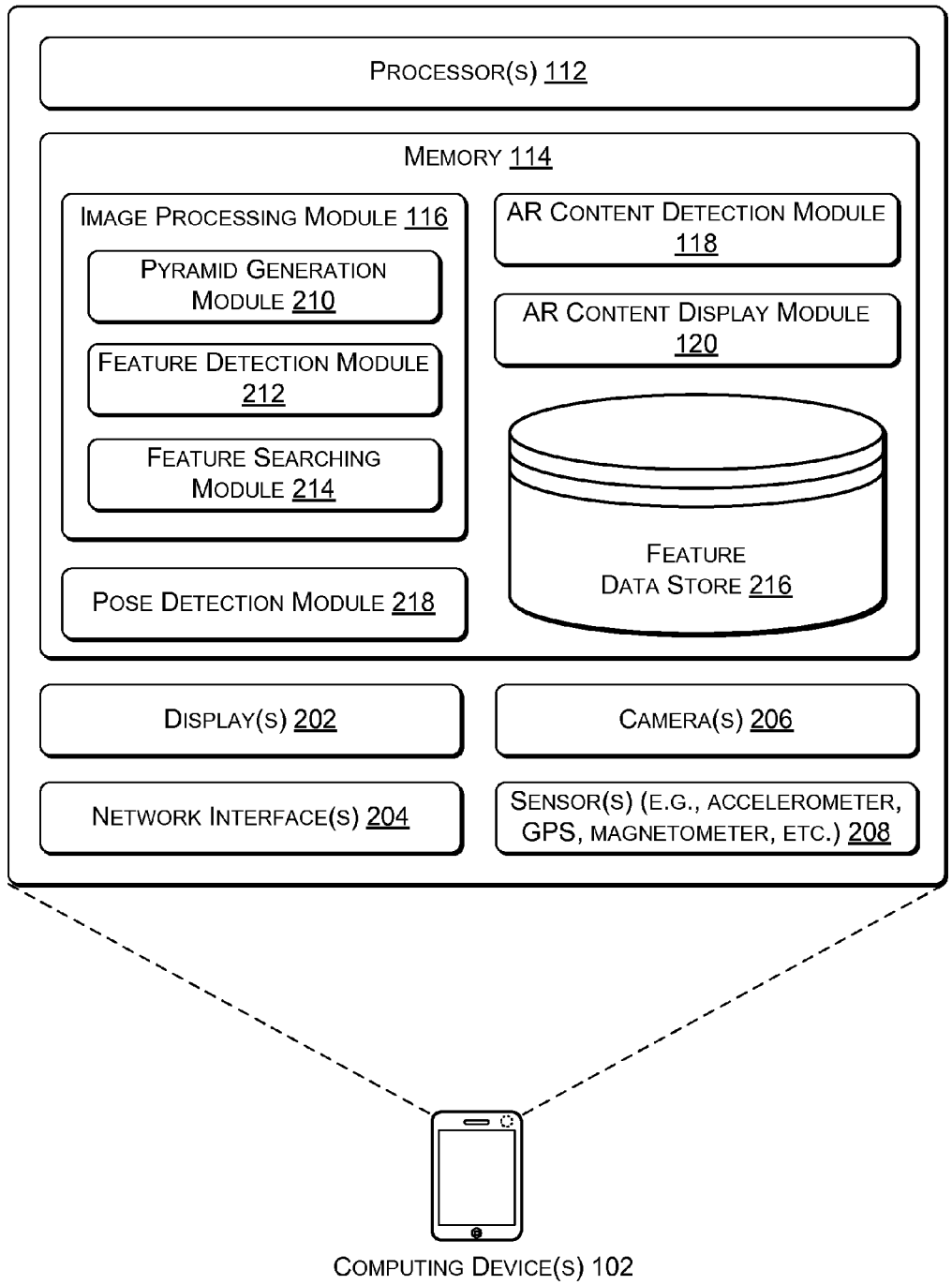
FIG. 2 illustrates further details of the example computing device of FIG. 1.

FIG. 2 illustrates further details of the example computing device 102 of FIG. 1. As noted above, the device 102 may generally augment a reality of a user by modifying an environment in which the user is located. In some instances, the device 102 may augment the reality of the user through the assistance of the AR service 104 and/or content source 106, while in other instances the device 102 may operate independent of AR service 104 and/or content source 106 (e.g., perform processing locally, obtain locally stored content, etc.).

The device 102 may include the one or more processors 112, the memory 114, one or more displays 202, one or more network interfaces 204, one or more cameras 206, and one or more sensors 208. In some instances, the one or more displays 202 are implemented as one or more touch screens. The one or more cameras 206 may include a front facing camera and/or a rear facing camera. The one or more sensors 208 may include an accelerometer, compass, gyroscope, magnetometer, Global Positioning System (GPS), olfactory sensor (e.g., for smell), microphone (e.g., for sound), tactile sensor (e.g., for touch), or other sensor.

As noted above, the memory 114 may include the image processing module 116 configured to process one or more images, such as video images. The image processing module 116 may include a pyramid generation module 210, a feature detection module 212, and a feature searching module 214. The modules 210-214 may operate in conjunction with each other to perform various computer vision operations on images from an environment in which the device 102 is located.

The pyramid generation module 210 may be configured to sub-sample and/or smooth an image to create a pyramid representation of the image. A pyramid representation may generally comprise a plurality of image layers that represent an image at different pixel resolutions. In one example, an image is represented by a pyramid that includes four image layers, however, in other examples the image may be represented by other numbers of image layers.

The pyramid generation module 210 may also be configured to generate feature relation information describing relations between features on different image layers of an image. The module 210 may associate a parent feature on a lower resolution image layer with a feature on a higher resolution image layer that is located within a predetermined proximity to the parent feature. The feature on the higher resolution image layer may be a child feature to the parent feature. As such, the child feature may represent the parent feature at a higher resolution. Upon associating parent and child features, the module 210 may generate feature relation information indicating a location of the child feature in relation to a location of the parent feature. The feature relation information may be represented in various forms, such as vector, coordinate point(s), and so on. In one example, a vector is used having a magnitude that corresponds to a distance between the parent feature to the child feature and having a direction from the parent feature to the child feature. The feature relation information may be generated upon detecting features in different image layers of an image by the feature detection module 212.

In some instances, the pyramid generation module 210 may also transform feature relation information by modifying a scale and/or orientation of the feature relation information. As the device 102 moves relative to a textured target, a feature associated with the textured target may change in scale and/or orientation as the feature is located in different images. To utilize feature relation information (e.g., a vector) generated for an initial image in a subsequent image, the feature relation information may be modified in scale and/or orientation.

The feature detection module 212 may analyze an image to detect features in the image. The features may correspond to points of interest in the image, such as a corner, edge, blob, or ridge. In instances where an image is represented by a pyramid representation, the module 212 may detect features in one or more image layers of the pyramid representation. To detect features in an image, the module 212 may utilize one or more feature detection and/or description algorithms commonly known to those of ordinary skill in the art, such as FAST, SIFT, SURF, or ORB. Once a feature has been detected, the detection module 212 may extract or generate a feature descriptor describing the feature, such as a patch of pixels (block of pixels). Extracted feature descriptors may be stored in a feature data store 216.

The feature searching module 214 may be configured to search an image or image layer to identify (e.g., find) a particular feature (e.g., block of pixels). The module 214 may generally begin searching within an initial search area of a subsequent image or image layer to find a block of pixels that has a threshold amount of similarity to a block of pixels of an initial image (e.g., feature of initial image). When the module 214 does not locate such a block of pixels in the subsequent image, the module 214 may expand the initial search area by a particular amount and search within the expanded area to find such a block of pixels. When the feature searching module 214 finds a block of pixels in the initial search area or an expanded search area that has a threshold amount of similarity, the module 214 may search from that block of pixels along a path of increasing similarity to the block of pixels of the initial image. In some instances, this may be referred to as performing gradient ascent (gradient analysis) or searching along a steepest gradient of similarity to the block of pixels of the initial image. Further details of the feature searching module 214 will be discussed below in reference to FIGS. 4A-4E.

The memory 114 may also include a pose detection module 218 configured to detect a pose of a textured target. A textured target may generally comprise a surface or a portion of a surface within an environment that has one or more textured characteristics. The module 218 may utilize features of an image to determine a pose of a textured target with respect to that image. For example, upon identifying multiple features in an image that represents a textured target, the module 218 may utilize locations of the multiple features to determine a pose of the textured target with respect to that image. The pose may generally indicate an orientation and/or position of the textured target within the environment with respect to a reference point, such as the device 102. The pose may be represented by various coordinate systems (e.g., x, y, z), angles, points, and so on. Although other techniques may be used, in some instances the module 218 determines a pose of a textured target by solving the Perspective-n-Point (PnP) problem, which is generally known by those of ordinary skill in the art.

The AR content detection module 118 may detect AR content that is associated with an environment of the device 102. The module 118 may generally perform an optical and/or geo-location analysis of an environment to find AR content that is associated with the environment. When the analysis indicates that one or more criteria are satisfied, the module 118 may trigger the creation of an AR experience (e.g., cause AR content to be displayed), as discussed below.

In a geo-location analysis, the module 118 primarily relies on a reading from the sensor 208 to trigger the creation of an AR experience, such as a GPS reading. For example, the module 118 may reference the sensor 208 and trigger an AR experience when the device 102 is located within a predetermined proximity to and/or is imaging a geographical location that is associated with AR content.

In an optical analysis, the module 118 primarily relies on optically captured signal to trigger the creation of an AR experience. The optically captured signal may include, for example, a still or video image from a camera, information from a range camera, LIDAR detector information, and so on. For example, the module 118 may analyze an image of an environment in which the device 102 is located and trigger an AR experience when the device 102 is imaging a textured target, object, or light oscillation pattern that is associated with AR content. In some instances, a textured target may comprise a fiduciary marker. A fiduciary marker may generally comprise a mark that has a particular shape, such as a square or rectangle. In many instances, the content to be augmented is included within the fiduciary marker as an image having a particular pattern (Quick Augmented Reality (QAR) or QR code).

In some instances, the AR content detection module 118 may utilize a combination of a geo-location analysis and an optical analysis to trigger the creation of an AR experience. For example, upon identify a textured target through analysis of an image, the module 118 may determine a geographical location being imaged or a geographical location of the device 102 to confirm the identity of the textured target. To illustrate, the device 102 may capture an image of the Statue of Liberty and process the image to identity the Statue. The device 102 may then confirm the identity of the Statue by referencing geographical location information of the device 102 or of the image.

In some instances, the AR content detection module 118 may communicate with the AR service 104 to detect AR content that is associated with an environment. For example, upon detecting features in an image through the feature detection module 212, the module 118 may send feature descriptors for those features to the AR service 104 for analysis (e.g., to identify a textured target and possibly identify content associated with the textured target). When a textured target for those feature descriptors is associated with AR content, the AR service 104 may inform the module 118 that such content is available. Although the AR service 104 may generally identify a textured target and content associated with the target, in some instances this processing may be performed at the module 118 without the assistance of the AR service 104.

The AR content display module 120 may control the display of AR content on the display 202 to create a perception that the content is part of an environment. The module 120 may generally cause the AR content to be displayed in relation to a textured target in the environment. For example, the AR content may be displayed in an overlaid manner on a substantially real-time image of the textured target. As the device 102 moves relative to the textured target, the module 120 may update a displayed location, orientation, and/or scale of the content so that the content maintains a relation to the textured target. In some instances, the module 120 utilizes a pose of the textured target to display the AR content in relation to the textured target.

Example Augmented Reality Service

Figure 3:
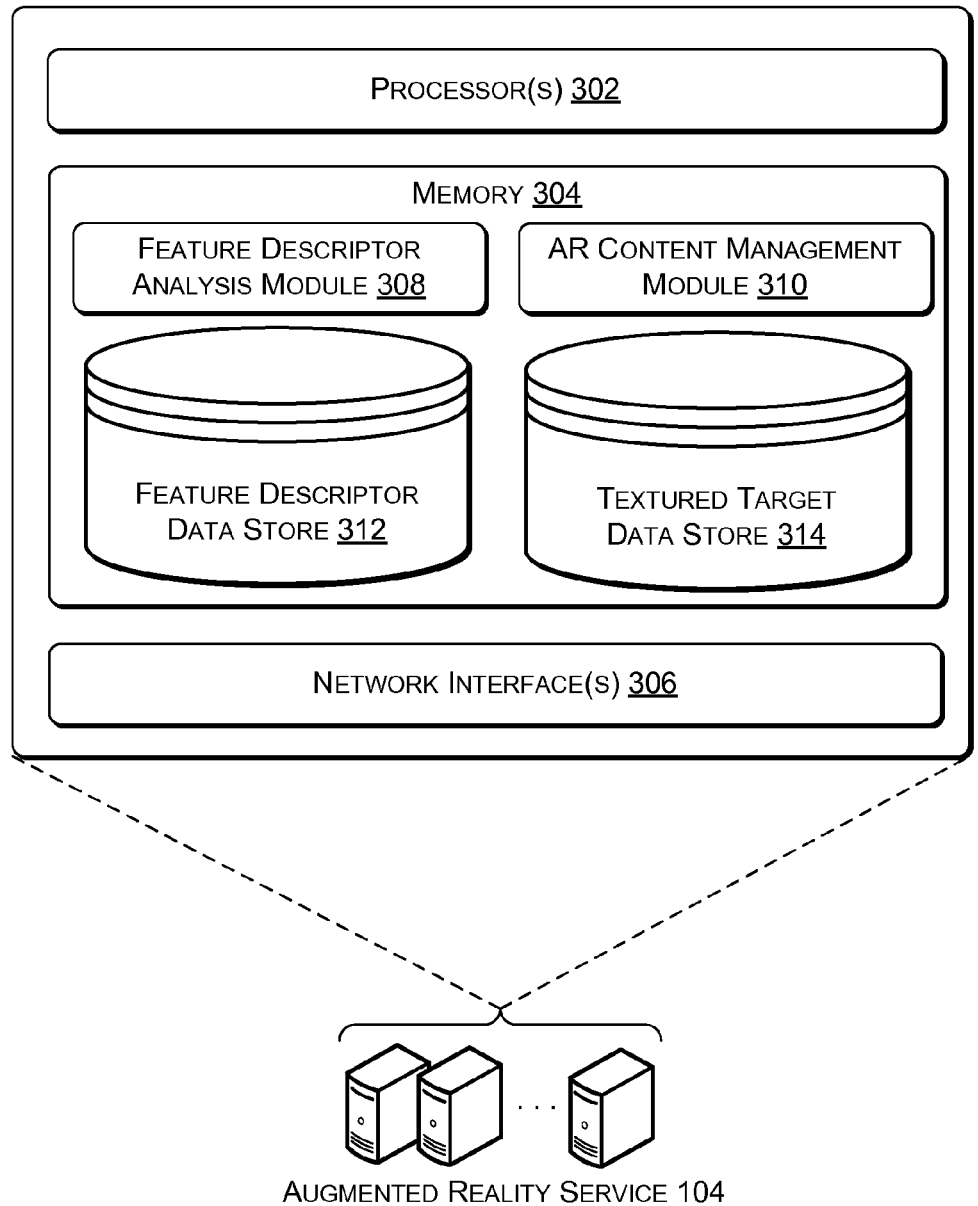
FIG. 3 illustrates additional details of the example augmented reality service of FIG. 1.

FIG. 3 illustrates additional details of the example AR service 104 of FIG. 1. The AR service 104 may include one or more computing devices that are each equipped with one or more processors 302, memory 304, and one or more network interfaces 306. As noted above, the one or more computing devices of the AR service 104 may be configured in a cluster, data center, cloud computing environment, or a combination thereof. In one example, the AR service 104 provides cloud computing resources, including computational resources, storage resources, and the like in a cloud environment.

As similarly discussed above with respect to the memory 114, the memory 304 may include software functionality configured as one or more "modules." However, the modules are intended to represent example divisions of the software for purposes of discussion, and are not intended to represent any type of requirement or required method, manner or necessary organization. Accordingly, while various "modules" are discussed, their functionality and/or similar functionality could be arranged differently (e.g., combined into a fewer number of modules, broken into a larger number of modules, etc.).

In the example AR service 104, the memory 304 includes a feature descriptor analysis module 308 and an AR content management module 310. The feature analysis module 308 is configured to analyze one or more feature descriptors to identify a textured target. For example, the analysis module 308 may compare a feature descriptor received from the device 102 with a library of feature descriptors of different textured targets stored in a feature descriptor data store 312 to identify a textured target that is represented by the feature descriptor. The feature descriptor data store 312 may provide a link between a textured target and one or more feature descriptors. For example, the feature descriptor date store 312 may indicate one or more feature descriptors (e.g., blocks of pixels) that are associated with the "Luke for President" poster.

The AR content management module 310 is configured to perform various operations for managing AR content. The module 310 may generally facilitate creation and/or identification of AR content. For example, the module 310 may provide an interface to enable users, such as authors, publishers, artists, distributors, advertisers, and so on, to create an association between a textured target and content. An association between a textured target and content may be stored in a textured target data store 314. In some instances, the AR content management module 310 may aggregate information from a plurality of devices and generate AR content based on the aggregated information. The information may comprise input from users of the plurality of devices indicating an opinion of the users, such as polling information.

The module 310 may also determine whether content is associated with a textured target. For instance, upon identifying a textured target within an environment (through analysis of a feature descriptor as described above), the module 310 may reference the associations stored in the textured target data store 314 to find AR content. To illustrate, Luke may register a campaign schedule with his "Luke for President" poster by uploading an image of his poster and his campaign schedule. Thereafter, when the user 110 views the poster through the device 102, the module 310 may identify this association and provide the schedule to the device 102 for consumption as AR content.

Additionally, or alternatively, the module 310 may modify AR content based on a geographical location of the device 102, profile information of the user 110, or other information. To illustrate, suppose the user 110 is at a concert for a band and captures an image of a CD that is being offered for sale. Upon recognizing the CD through analysis of the image with the feature descriptor analysis module 308, the module 310 may determine that an item detail page for a t-shirt of the band is associated the CD. In this example, the band has indicated that the t-shirt may be sold for a discounted price at the concert. Thus, before the item detail page is sent to the device 102 for display as AR content, the list price on the item detail page may be updated to reflect the discount. To add to this illustration, suppose that profile information of the user 110 is made available to the AR service 104 through the express authorization of the user 110. If, for instance, a further discount is provided for a particular gender (e.g., due to decreased sales for the particular gender), the list price of the t-shirt may be updated to reflect this further discount.

Example Feature Searching

FIGS. 4A-4E illustrate example search techniques to locate a feature of an initial image in a subsequent image. For ease of illustration the search techniques are described as being performed by the device 102 in the architecture 100 of FIG. 1 (e.g., the feature searching module 214 of the device 102). However, the search techniques may alternatively, or additionally, be performed by the AR service 104 and/or another device.

FIGS. 4A-4E each include (1) an image view 402 on a right-hand side of the figure that illustrates the different pixels of an image (e.g., each square represents a pixel) and (2) a graph view 404 on a left-hand side of the figure that illustrates matching values for different blocks of pixels (e.g., points) in the image. In the graph view 404, the x-axis represents the position of a block of pixels along a horizontal position of the image view 402 and the y-axis represents a matching value of a block of pixels. For ease of illustration, the graph view 404 shows matching values for block of pixels along a horizontal position of the image view 402 without accounting for a vertical position of the block of pixels. As such, the graph view 404 illustrates a 2D graph for matching values. As discussed below, FIG. 5 illustrates one example of a 3D graph of matching values that accounts for a vertical and horizontal position of a block of pixels.

A matching value may indicate how similar a block of pixels is to a particular reference block of pixels. For example, in FIG. 4A, the matching value of a 3×3 block of pixels centered on a start pixel 406 may indicate how similar that block of pixels is to a 3×3 block of pixels that represents a feature of image 1 (e.g., a block of pixels of image 1 408). In some instances, a matching value may comprise a normalized cross correlation score.

Figure 4A:
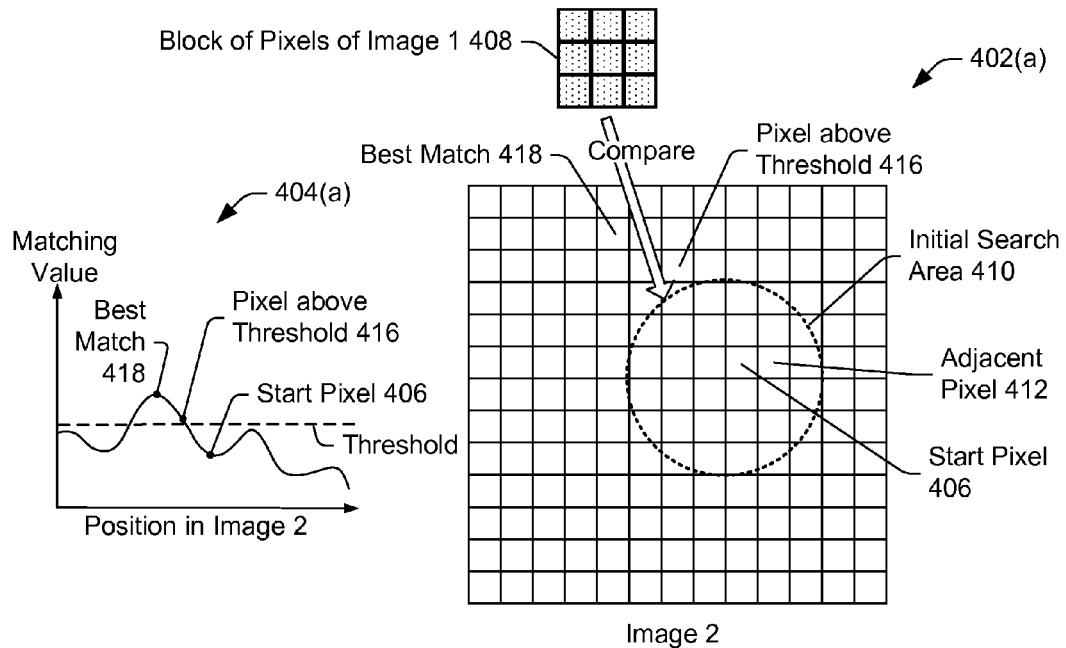
FIGS. 4A-4E illustrate example search techniques to locate a feature of an initial image in a subsequent image.
Figure 5:
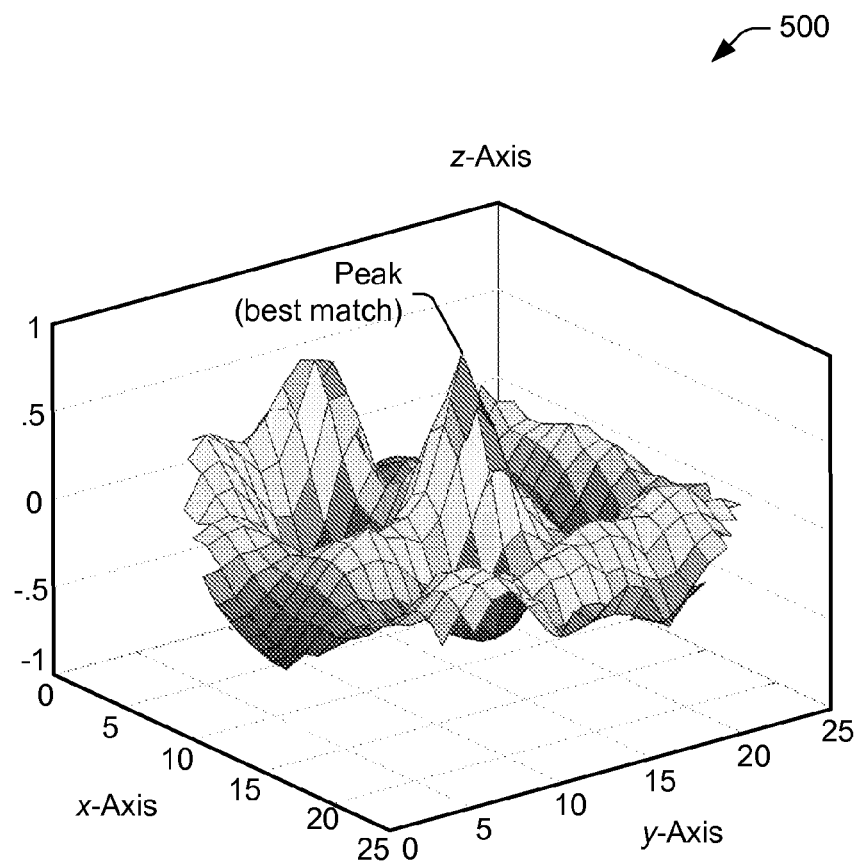
FIG. 5 illustrates an example 3D graph of matching values for different blocks of pixels in an image with respect to a reference block of pixels.

In FIG. 4A, the device 102 may define an initial search area 410 in image 2 to search for the block of pixels of image 1 408 (sometimes referred to as "feature to match" or "feature of image 1"). Here, the feature of image 1 408 has been detected in image 1 and a block of pixels has been extracted to represent the feature of image 1 408 (as illustrated by the 3×3 block of pixels filled with stippling). The initial search area 410 may take many forms (e.g., different shapes) and may include one or more predefined dimensions, such as a particular pixel radius (e.g., five pixels), particular length or width, and so on. As illustrated in FIG. 4A, the initial search area 410 includes a circle having a three pixel radius.

In some instances, the initial search area 410 may be defined based on a velocity of a textured target and/or feature relation information. For example, based on an estimate velocity of the feature of image 1 408 (or an associated textured target) relative to the device 102, the device 102 may predict where the feature of image 1 408 will be located in image 2 and define the initial search area 410 to be substantially centered on the predicted location. Alternatively, or additionally, upon identifying the feature of image 1 408 in a relatively low resolution image layer of image 2, the device 102 may utilize feature relation information describing relations between features on different image layers of image 1 to predict where the feature of image 1 408 may be located in a relatively high resolution image layer of image 2.

In FIG. 4A, the device 102 may search the initial search area 410 to find a block of pixels that has a threshold amount of similarity to the block of pixels of image 1 408. In some instances, the search may include determining whether or not a matching value (e.g., a normalized cross correlation score) of a block of pixels is larger than a threshold (e.g., 0.7 score). The search may begin at the start pixel 406 and proceed to adjacent pixels in the initial search area 410 row-by-row. That is, the device 102 may compare a 3×3 block of pixels centered on the start pixel 406 to the block of pixels of image 1 408. If there is not a threshold amount of similarity, then the device 102 may compare a 3×3 block of pixels centered on a pixel that is directly adjacent to the start pixel (adjacent pixel 412). The device 102 may proceed in a similar manner through the initial search area 410 to find a block of pixels that has a threshold amount of similarity to the block of pixels of image 1 408.

Figure 4B:
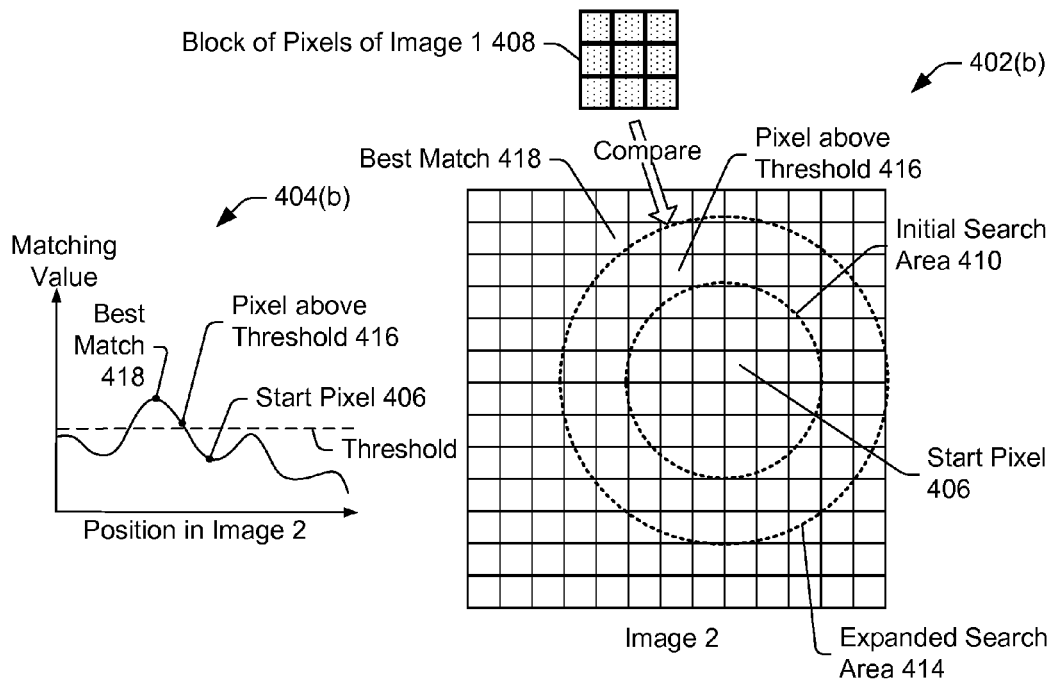

If the device 102 does not find a block of pixels in the initial search area 410 that has a threshold amount of similarity, the initial search area 410 may be expanded to encompass a larger area (expanded search area 414), as illustrated in FIG. 4B. The device 102 may continue searching in the expanded search area 414 through adjacent pixels to find a block of pixels that has a threshold amount of similarity. In some instances, the device 102 may skip blocks of pixels that have already been searched (e.g., refrain from searching blocks of pixels in the initial search area 410). The device 102 may expand the search area any number of times until a block of pixels is found that has a threshold amount of similarity. In FIG. 4B, the device 102 has found a block of pixels that satisfies the threshold (e.g., a 3×3 block of pixels centered on a pixel above the threshold 416).

Figure 4C:
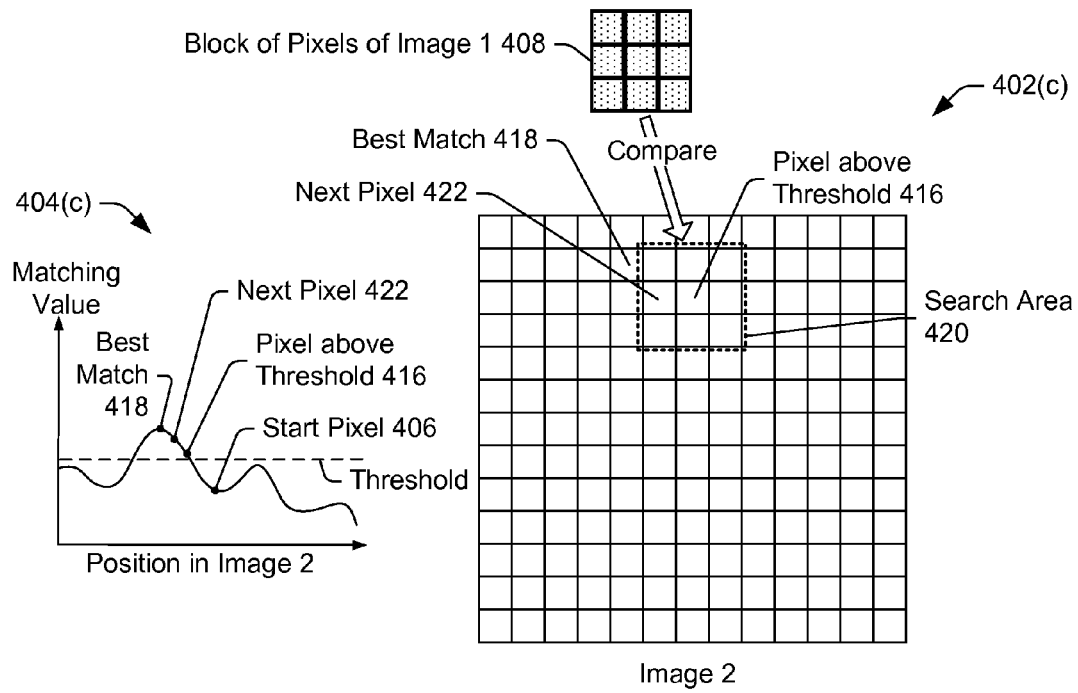
Figure 4D:
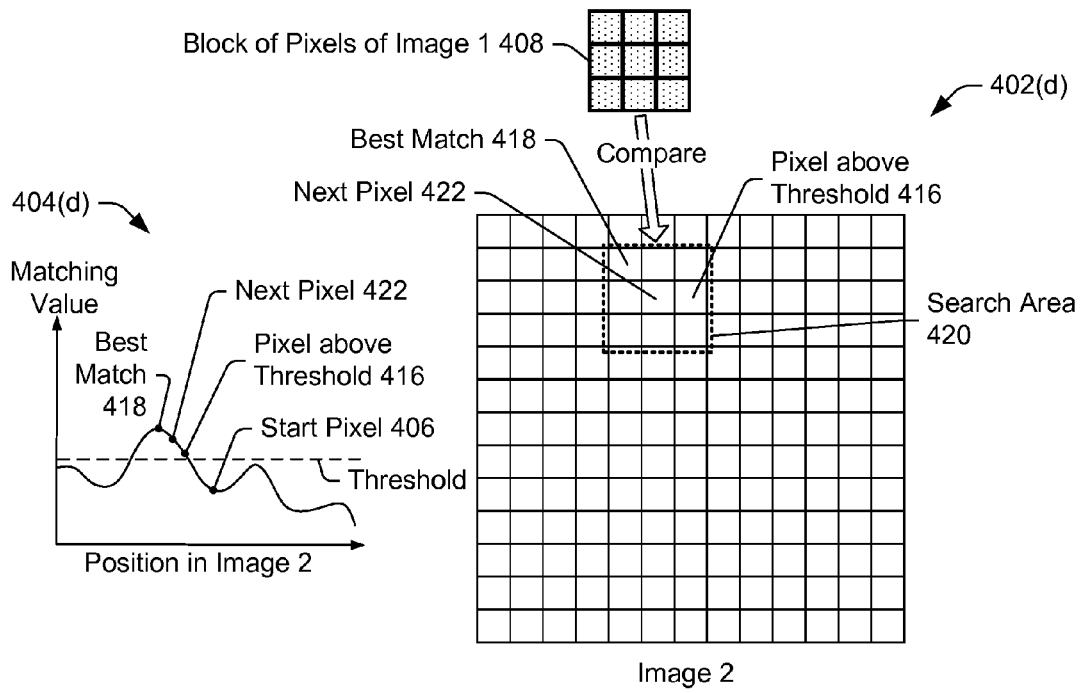
Figure 4E:
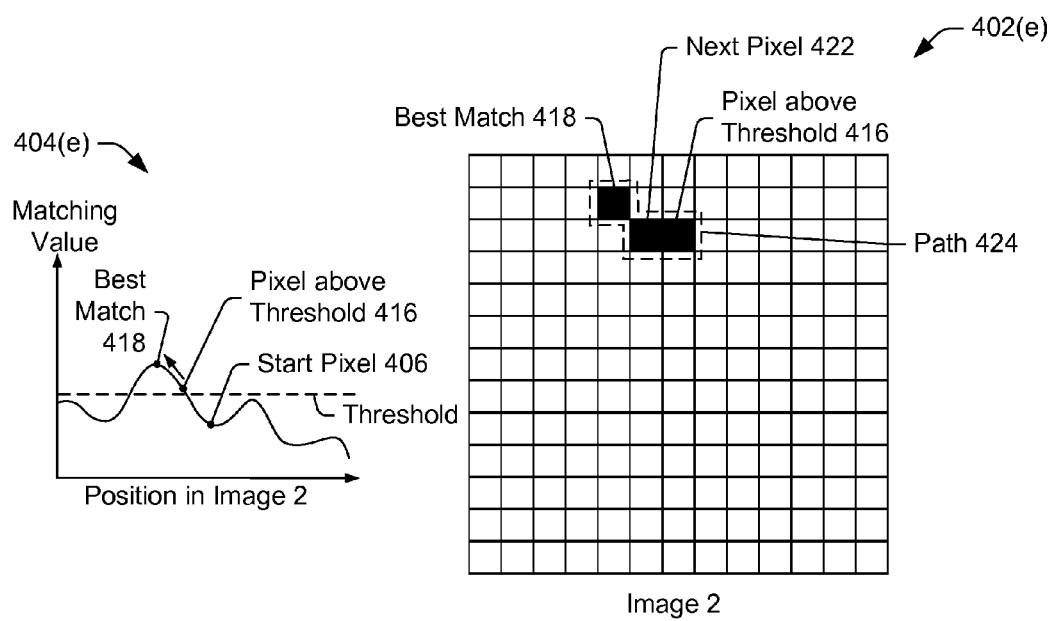

In FIGS. 4C-4E, upon finding a block of pixels that satisfies the threshold, the device 102 may search from that block of pixels along a path of increasing similarity to the block of pixels of image 1 408. That is, the device 102 may ascend a gradient of greatest similarity to the feature of image 1 408. In the graph view 404 of FIGS. 4C-4E, this may include traveling from the pixel above the threshold 416 to a best match pixel 418.

To search along a path of increasing similarity, the device 102 may define a search area 420 in relation to the pixel above the threshold 416. For example, the search area 420 may be substantially centered on the pixel above the threshold 416, as illustrated in FIG. 4C. Although the search area 420 is illustrated as a 3×3 pixel block, the search area 420 may comprise other shapes and/or sizes. The device 102 may then search within the search area 420 for a 3×3 block of pixels that has a larger amount of similarity to the block of pixels of image 1 408 than the 3×3 block of pixels centered on the pixel above the threshold 416. In some instances, the search may include determining whether or not a matching value (e.g., normalized cross correlation score) of a block of pixels is larger than a value of the block of pixels centered on the pixel above the threshold 416. In the example of FIG. 4C, the device 102 determines that a 3×3 block of pixels centered on a next pixel 422 has a larger amount of similarity to the block of pixels of image 1 408 than the 3×3 block of pixels centered on the pixel above the threshold 416. As illustrated, the 3×3 block of pixels centered on the next pixel 422 includes a pixel from the 3×3 block of pixels centered on the pixel above the threshold 416.

Upon finding the block of pixels that has a larger amount of similarity, the device 102 moves the search area 420 to be centered on the next pixel 422, as illustrated in FIG. 4D. The device 102 then searches in the search area 420 centered on the next pixel 422 to find a 3×3 block of pixels that has yet a larger amount of similarity to the block of pixels of image 1 408 than the 3×3 block of pixels centered on the next pixel 422. In this example, the device 102 determines that a 3×3 block of pixels centered on the best match pixel 418 has a larger amount of similarity to the block of pixels of image 1 408 than the 3×3 block of pixels centered on the next pixel 422. The device 102 may move the search area 420 to be centered on the best match pixel 418 and determine that there are no further blocks of pixels that have a larger amount of similarity to the block of pixels of image 1 408.

FIG. 4E illustrates a search path 424 that was traveled in FIGS. 4C-4D to find a block of pixels that corresponds to the block of pixels of image 1 408. The search path 424 may correspond to a path of increasing similarity to the block of pixels of image 1 408. As illustrated, the search has traveled from the pixel above the threshold 416 to the next pixel 422 and from the next pixel 422 to the best match pixel 418. As such, the search may travel along adjacent pixels until a best match is found. By doing so, the device 102 may intelligently search for a block of pixels in a subsequent image that is a best match to a block of pixels of an initial image.

Example Graph of Matching Values

FIG. 5 illustrates an example 3D graph 500 of matching values for different blocks of pixels in an image with respect to a reference block of pixels. For example, the graph 500 may indicate an amount of similarity a block of pixels in a subsequent image (represented at a center pixel) has to a block of pixels in an initial image. In the graph 500, the x-axis represents the position of a block of pixels along a horizontal position of the subsequent image (e.g., x-axis of image), the y-axis represents the position of the block of pixels along a vertical position of the subsequent image (e.g., y-axis of image), and the z-axis represents a matching value of the block of pixels to the reference block of pixels. A block of pixels that has a relatively high matching value may indicate that the block of pixels is a better match to a reference block of pixels than another block of pixels that has a relatively low matching value. As illustrated, a peak represents a center pixel of a pixel block in the image that has a largest amount of similarity to a reference block of pixels with respect to other blocks of pixels in the image. The techniques described herein may be performed to find this block of pixels.

Example Processes

Figure 6:
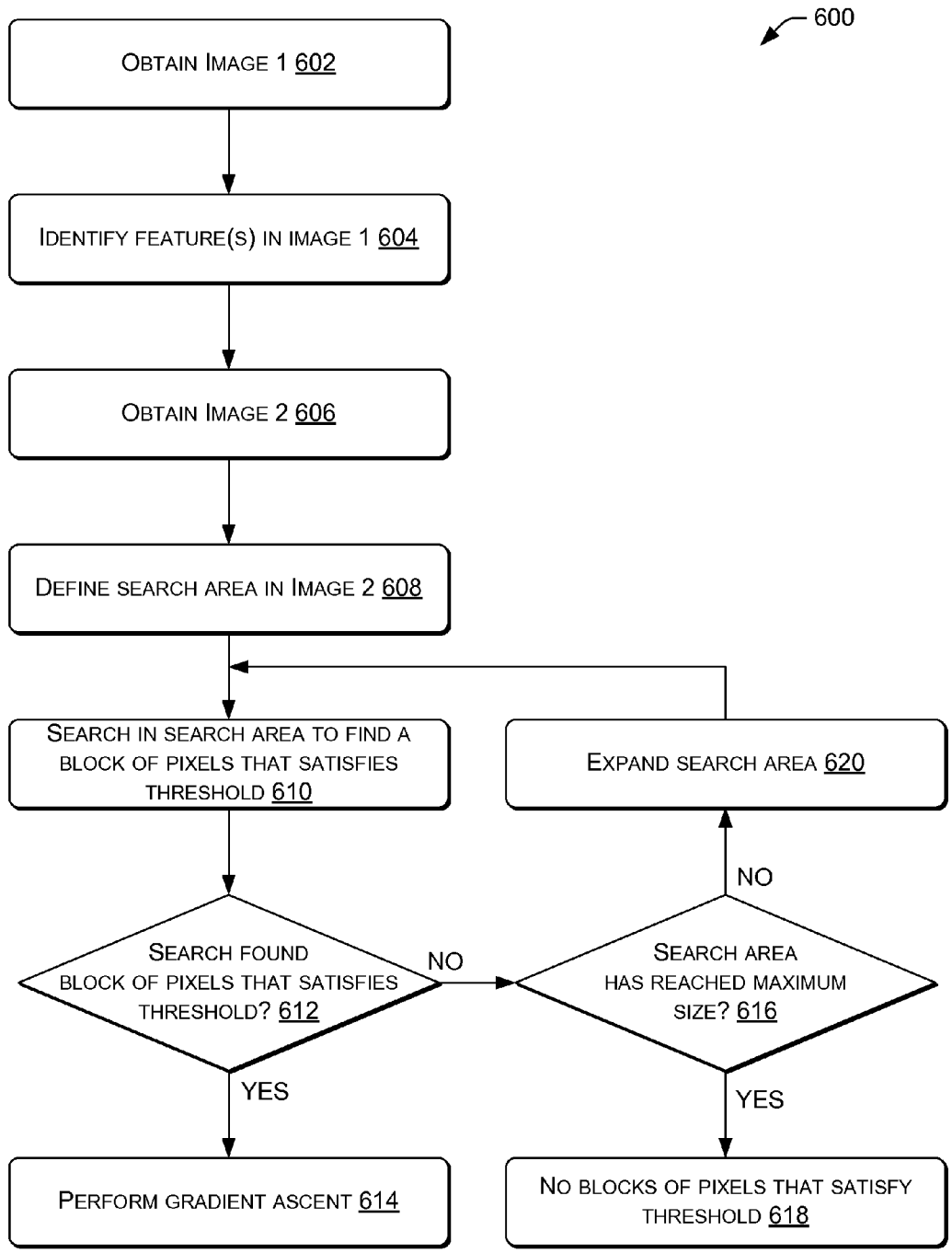
FIG. 6 illustrates an example process to find a block of pixels that has a threshold amount of similarity to a particular block of pixels and to search along a path of increasing similarity to the particular block of pixels.
Figure 7:
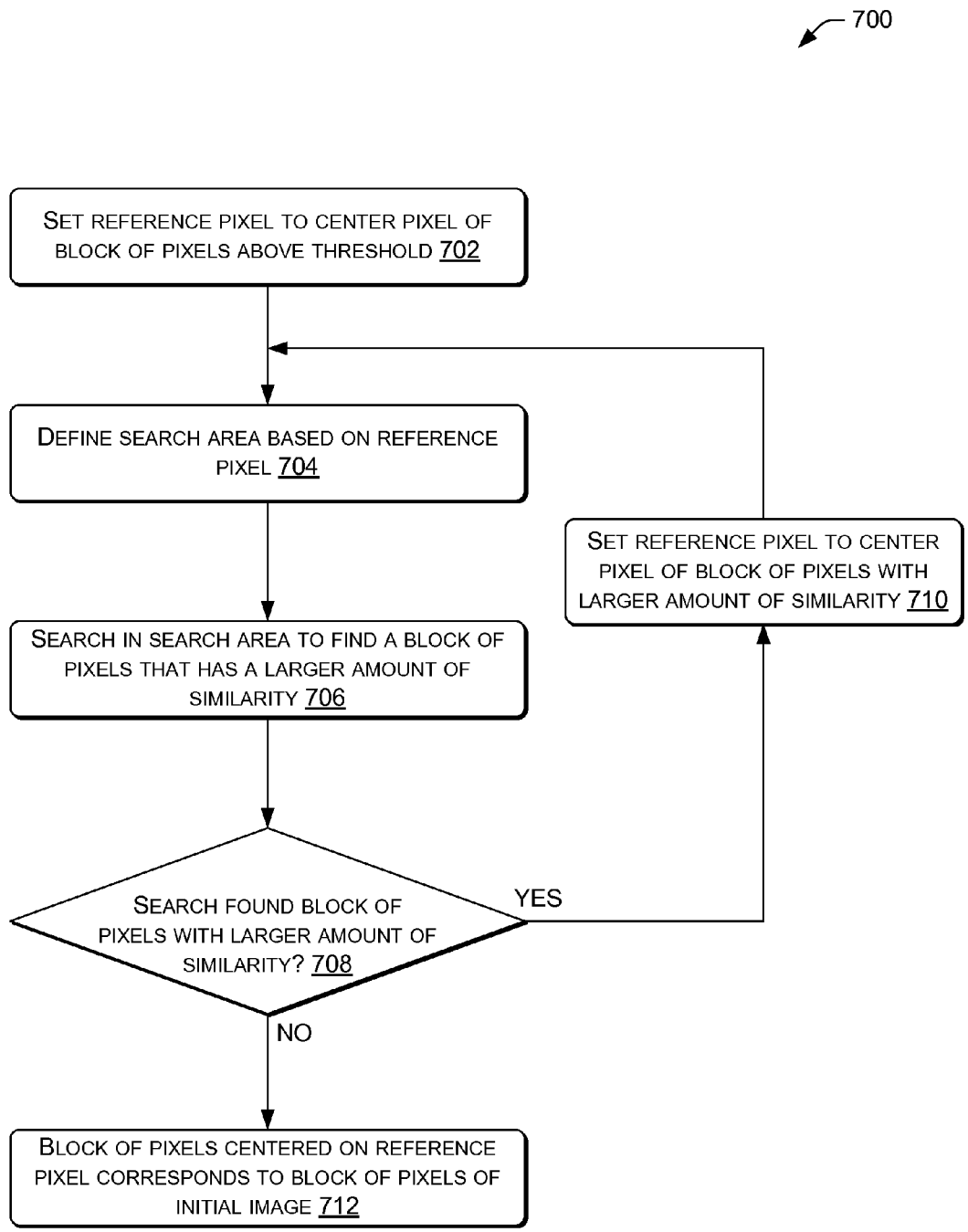
FIG. 7 illustrates an example process to search along a path of increasing similarity to a particular block of pixels.

FIGS. 6-7 illustrate example processes 600 and 700 for employing the techniques described herein. For ease of illustration the processes 600 and 700 are described as being performed by the device 102 in the architecture 100 of FIG. 1. However, the processes 600 and 700 may alternatively, or additionally, be performed by the AR service 104 and/or another device. Further, the processes 600 and 700 may be performed in other architectures, and the architecture 100 may be used to perform other processes.

The processes 600 and 700 (as well as each process described herein) are illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process. In some instances, any number of the described operations may be omitted.

FIG. 6 illustrates the example process 600 to find a block of pixels that has a threshold amount of similarity to a particular block of pixels and to search along a path of increasing similarity to the particular block of pixels.

At 602, the device 102 may obtain image 1 by capturing the image with a camera of the device 102, for example. At 604, image 1 may be processed to identify one or more features in image 1. Each of the one or more features may be represented by a block of pixels.

At 606, the device may obtain image 2 by capturing the image with the camera of the device 102, for example. At 608, the device may define a search area within image 2 or an image layer of image 2. The search area may be defined based on an estimated velocity of a textured target relative to the device 102 and/or feature relation information describing relations between features on different image layers.

At 610, the device 102 may search in the search area to find a block of pixels that has a threshold amount of similarity to a block of pixels of image 1. The device 102 may compare blocks of pixels in the search area to the block of pixels of image 1 to find a block of pixels that satisfies the threshold. The search may begin at a center of the search area and proceed through adjacent pixels.

When, at 612, the search finds a block of pixels that satisfies the threshold, the process 600 may proceed to 614. At 614, the device 102 may perform gradient ascent. That is, the device 102 may search from the block of pixels that satisfies the threshold along a path of increasing similarity to the block of pixels of image 1.

Alternatively, when, at 612, the search does not find a block of pixels that satisfies the threshold, the process 600 may proceed to 616. At 616, the device 102 may determine whether or not the search area has reached its maximum size (e.g., predetermined size). When, at 616, the search area has reached its maximum size, the process 600 may proceed to 618 and determine that there are no blocks of pixels within the search area that satisfy the threshold.

Alternatively, when, at 616, the search area has not reached its maximum size, the process may proceed to 620 and expand the search area to encompass a larger area. The process 600 may then return to 610 and search within the expanded search area. In some instances, the search may skip blocks of pixels that have already been searched in the initial search area.

In some instances, the device 102 may utilize a found block of pixels in image to process an associated textured target represented in image 2. For example, the device 102 may utilize the block of pixels to track a location of the textured target, identify a pose of the textured target, and/or determine a velocity of the textured target relative to the device 102. This may allow the device 102 to display AR content in relation to the textured target.

FIG. 7 illustrates the example process 700 to perform gradient ascent. In some instances, the process 700 is performed at 616 of FIG. 6, while in other instances the process 700 is performed at other operations or in other processes.

At 702, the device 102 may set a reference pixel in image 2 to a center pixel of a block of pixels of image 2 that has a threshold amount of similarity to a block of pixels of image 1 (e.g., the pixel above the threshold of FIG. 4C).

At 704, the device 102 may define a search area based on the reference pixel. For example, the search area may be substantially centered on the reference pixel, such as in the case of the search area defined by the pixel above the threshold of FIG. 4C.

At 706, the device 102 may search within the search area for a block of pixels that has a larger amount of similarity to the block of pixels of image 1 than the block of pixels centered on the reference pixel. When, at 708, the search finds such a block of pixels in the search area, the process 700 may proceed to 710.

At 710, the device 102 may set the reference pixel to the center pixel of the block of pixels that has the larger amount of similarity. Thereafter, the operations 704-708 may be performed with respect to a search area defined by the new reference pixel. That is, the device 102 may define a search area based on the new reference pixel and search in the updated search area for a block of pixels that has a larger amount of similarity to the block of pixels of image 1 than the block of pixels that is centered on the new reference pixel.

Alternatively, when, at 708, the search does not find a block of pixels in the search area that has a larger amount of similarity to the block of pixels of image 1 than the block of pixels centered on the reference pixel, the process 700 may proceed to 714. At 712, the device 102 may determine that the block of pixels centered on the reference pixel corresponds to the block of pixels of image 1. In other words, the block of pixels centered on the reference pixel may comprise a "best match" in image 2 to the block of pixels of image 1.

CONCLUSION

Although embodiments have been described in language specific to structural features and/or methodological acts, it is to be understood that the disclosure is not necessarily limited to the specific features or acts described. Rather, the specific features and acts are disclosed herein as illustrative forms of implementing the embodiments.

What is claimed is:

1. A method comprising:
   under control of a computing device configured with computer-executable instructions, capturing, with a camera of the computing device, a first image of an environment in which the computing device is located;
identifying a block of pixels in the first image that corresponds to a point of interest in the first image;
capturing a second image with the camera;
searching in a defined search area of the second image to identify a first block of pixels that has a threshold amount of similarity to the block of pixels of the first image;
upon identifying the first block of pixels in the second image, determining whether a second block of pixels in the second image has a larger amount of similarity to the block of pixels of the first image than the first block of pixels of the second image, the second block of pixels of the second image including at least one pixel that is included in the first block of pixels of the second image; and
in the event that the second block of pixels of the second image does not have a larger amount of similarity to the block of pixels of the first image than the first block of pixels of the second image, determining that the first block of pixels of the second image corresponds to the block of pixels of the first image.

2. The method of claim 1, wherein the defined search area includes one or more predefined dimensions.

3. The method of claim 1, wherein searching in the defined search area of the second image comprises:
searching the second image within a first search area to identify the first block of pixels that has the threshold amount of similarity to the block of pixels of the first image; and
in the event that the first block of pixels of the second image is not identified during searching within the first search area, searching the second image within a second search area to identify the first block of pixels that has the threshold amount of similarity to the block of pixels of the first image, the second search area being larger in area than the first search area.

4. The method of claim 1, further comprising:
in the event that the second block of pixels of the second image has a larger amount of similarity to the block of pixels of the first image than the first block of pixels of the second image, determining whether a third block of pixels in the second image has a larger amount of similarity to the block of pixels of the first image than the second block of pixels of the second image, the third block of pixels of the second image including at least one pixel of the second block of pixels of the second image; and
in the event that the third block of pixels of the second image does not have a larger amount of similarity to the block of pixels of the first image than the second block of pixels of the second image, determining that the second block of pixels of the second image corresponds to the block of pixels of the first image.

5. The method of claim 1, wherein determining whether a second block of pixels in the second image has a larger amount of similarity to the block of pixels of the first image than the first block of pixels of the second image comprises utilizing a normalized cross correlation score of the second block of pixels.

6. A method comprising:
under control of a computing device configured with computer-executable instructions,
obtaining a first image;
identifying a block of pixels in the first image that corresponds to a point of interest in the first image;
obtaining a second image;
searching in a defined search area of the second image to identify a particular block of pixels that has a threshold amount of similarity to the block of pixels of the first image; and
upon identifying the particular block of pixels in the second image, performing gradient ascent from the particular block of pixels of the second image to identify a block of pixels in the second image that corresponds to the block of pixels in the first image.

7. The method of claim 6, wherein performing gradient ascent from the particular block of pixels of the second image comprises:
comparing a first block of pixels of the second image to the block of pixels of the first image to determine whether the first block of pixels of the second image has a larger amount of similarity to the block of pixels of the first image than the particular block of pixels of the second image, the first block of pixels including at least one pixel that is included in the particular block of pixels; and
in the event that the first block of pixels of the second image has a larger amount of similarity to the block of pixels of the first image than the particular block of pixels of the second image, comparing a second block of pixels of the second image to the block of pixels of the first image to determine whether the second block of pixels of the second image has a larger amount of similarity to the block of pixels of the first image than the first block of pixels of the second image.

8. The method of claim 7, wherein performing gradient ascent from the particular block of pixels of the second image comprises:
in the event that the second block of pixels of the second image has a larger amount of similarity to the block of pixels of the first image than the first block of pixels of the second image, determining that the second block of pixels of the second image corresponds to the block of pixels of the first image; and
in the event that the second block of pixels of the second image does not have a larger amount of similarity to the block of pixels of the first image than the first block of pixels of the second image, determining that the first block of pixels of the second image corresponds to the block of pixels of the first image.

9. The method of claim 6, wherein the defined search area includes one or more predefined dimensions.

10. The method of claim 6, wherein searching in the defined search area of the second image comprises:
searching the second image within a first search area to identify the particular block of pixels that has the threshold amount of similarity to the block of pixels of the first image; and
in the event that the particular block of pixels of the second image is not identified during searching within the first search area, searching the second image within a second search area to identify the particular block of pixels that has the threshold amount of similarity to the block of pixels of the first image, the second search area being larger in area than the first search area.

11. The method of claim 10, wherein searching the second image within the second search area comprises refraining from searching blocks of pixels of the second image that have been searched while searching the second image within the first search area.

12. The method of claim 6, wherein searching in the second image comprises utilizing normalized cross correlation scores of blocks of pixels of the second image to identify the particular block of pixels that has the threshold amount of similarity to the block of pixels of the first image.

13. The method of claim 6, wherein performing gradient ascent from the particular block of pixels of the second image comprises utilizing normalized cross correlation scores of blocks of pixels in the second image to identify a block of pixels in the second image that corresponds to the block of pixels of the first image.

14. A system comprising:
one or more processors; and
memory, communicatively coupled to the one or more processors, storing executable instructions that, when executed by the one or more processors, cause the one or more processors to perform acts comprising:
obtaining a first image;
identifying a block of pixels in the first image that corresponds to a point of interest in the first image;
obtaining a second image;
searching in a defined search area of the second image to identify a particular block of pixels that has a threshold amount of similarity to the block of pixels of the first image; and
upon identifying the particular block of pixels in the second image, searching in the second image along a path of increasing similarity to the block of pixels of the first image to identify a block of pixels in the second image that corresponds to the block of pixels in the first image.

15. The system of claim 14, wherein searching in the second image along a path of increasing similarity to the block of pixels of the first image comprises:
comparing a first block of pixels of the second image to the block of pixels of the first image to determine whether the first block of pixels of the second image has a larger amount of similarity to the block of pixels of the first image than the particular block of pixels of the second image, the first block of pixels including at least one pixel that is included in the particular block of pixels; and
in the event that the first block of pixels of the second image has a larger amount of similarity to the block of pixels of the first image than the particular block of pixels of the second image, comparing a second block of pixels of the second image to the block of pixels of the first image to determine whether the second block of pixels of the second image has a larger amount of similarity to the block of pixels of the first image than the first block of pixels of the second image.

16. The system of claim 15, wherein searching in the second image along a path of increasing similarity to the block of pixels of the first image comprises:
in the event that the second block of pixels of the second image has a larger amount of similarity to the block of pixels of the first image than the first block of pixels of the second image, determining that the second block of pixels of the second image corresponds to the block of pixels of the first image; and
in the event that the second block of pixels of the second image does not have a larger amount of similarity to the block of pixels of the first image than the first block of pixels of the second image, determining that the first block of pixels of the second image corresponds to the block of pixels of the first image.

17. The system of claim 14, wherein:
the defined search area in the second image is based at least in part on a location of the block of pixels in the first image and an estimated velocity of the block of pixels of the first image, the defined search area having one or more predefined dimensions.

18. The system of claim 14, wherein searching in the defined search area of the second image to identify a particular block of pixels that has a threshold amount of similarity to the block of pixels of the first image comprises:
searching the second image within a first search area to identify the particular block of pixels that has the threshold amount of similarity to the block of pixels of the first image; and
in the event that the particular block of pixels of the second image is not identified while searching within the first search area, searching the second image within a second search area to identify the particular block of pixels that has the threshold amount of similarity to the block of pixels of the first image, the second search area being larger in area than the first search area.

19. The system of claim 18, wherein searching the second image within the second search area comprises refraining from searching blocks of pixels of the second image that have been searched while searching the second image within the first search area.

20. One or more computer-readable storage media storing computer-readable instructions that, when executed, instruct one or more processors to perform operations comprising:
comparing a block of pixels from a first image to a block of pixels from a second image in a defined search area of the second image to determine whether the block of pixels of the second image has a threshold amount of similarity to the block of pixels of the first image; and
upon determining that the block of pixels of the second image has a threshold amount of similarity to the block of pixels of the first image, using gradient analysis to identify a particular block of pixels in the second image that corresponds to the block of pixels of the first image.

21. The one or more computer-readable storage media of claim 20, wherein using gradient analysis comprises searching in the second image along a path of adjacent pixels to identify the particular block of pixels in the second image that corresponds to the block of pixels of the first image.

22. The one or more computer-readable storage media of claim 20, wherein using gradient analysis comprises searching in the second image based on a location of the block of pixels that has the threshold amount of similarity to the block of pixels of the first image, the search finding a block of pixels that has a larger amount of similarity to the block of pixels of the first image than the block of pixels that has the threshold amount of similarity.

* * * * *